(No Model.)
C. F. MATTHES.
Coffee-Pot.
No. 227,805. Patented May 18, 1880.
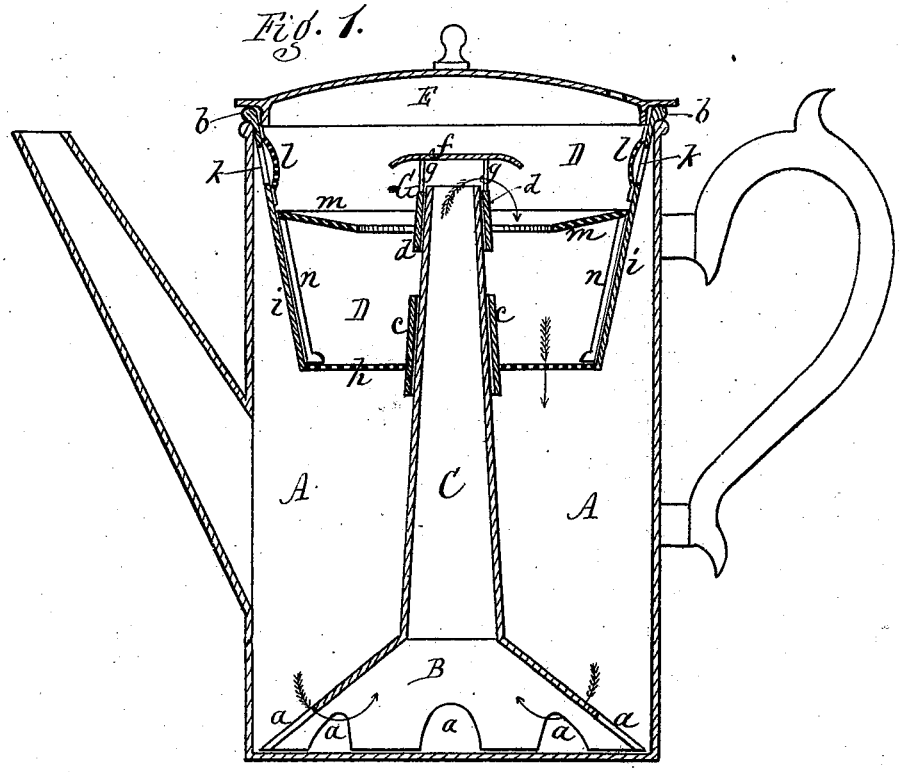
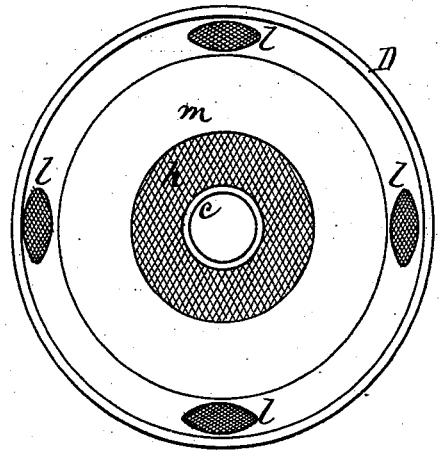
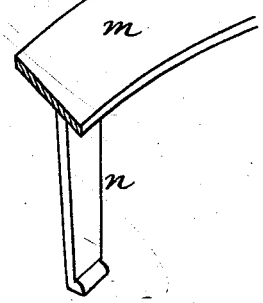
Attest.
Chas F. Simon
Jacob Bjorken
Inventor.
C. Fred Matthes,
pr R. F. Osgood,
Atty.
N. PETERS, PHOTO-LITHOGRAPHER, WASHINGTON, D. C.

UNITED STATES PATENT OFFICE.

C. FREDERICK MATTHES, OF LYONS, NEW YORK.

COFFEE-POT.

SPECIFICATION forming part of Letters Patent No. 227,805, dated May 18, 1880.

Application filed March 17, 1880. (No model.)

*To all whom it may concern:*

Be it known that I, C. FREDERICK MATTHES, of Lyons, Wayne county, New York, have invented a certain new and useful Improvement in Coffee-Pots; and I do hereby declare that the following is a full, clear, and exact description of the same, reference being had to the accompanying drawings, in which—

Figure 1 is a central vertical section of a coffee-pot provided with my improvement. Fig. 2 is a plan of the receiving-chamber. Fig. 3 is a perspective view of a portion of the flange.

My improvement relates to coffee-pots in which a central tube is used, through which the liquid is elevated by the force of the steam, and in which a perforated receiving-chamber is used at the top to catch the sediment and allow the return of the liquid to the bottom of the pot again.

The invention consists in the construction and arrangement of parts hereinafter more fully described and claimed.

In the drawings, A represents the coffee-pot, which is made of cylindrical form, and is otherwise of ordinary construction. B is the heating-chamber, consisting of a cone-shaped body which rests on the bottom of the pot, and is provided with openings $a\ a$ at the sides, by which the liquid is admitted to the interior. The bottom of the chamber is open, and it rests loosely on the bottom of the pot.

C is a conical tube fast to the heating-chamber and extending nearly but not quite to the top of the pot. D is the receiving-chamber, which is of conical form, and is provided with a rim or flange, $b$, which rests upon and is supported by the top of the pot. It is preferably wired at the upper edge for the purpose.

E is a cover which rests in the open top of the receiving-chamber, and also forms a cover for the pot. $c$ is a short thimble or tube attached to the bottom of the receiving-chamber, and which slips loosely over the central tube, C, so that the receiving-chamber may be inserted and removed independently of the heating-chamber and its spout. G is an attachment consisting of a small tube, $d$, sliding on the end of the central tube, C, and above the tube $c$, and $f$ is a cap or deflector located above the top of the central tube and connected with the tube $d$ by stays $g\ g$.

The operation will be readily understood.

The liquid entering the heating-chamber B through the openings $a\ a$ becomes heated, is forced up through tube C, and, striking under the cap or deflector $f$, is thrown downward into the receiving-chamber D, and, passing through the perforated bottom of the same, falls to the bottom of the pot again. The coffee may either be placed in the chamber D, and receive the action of the water percolating through it, or it may be placed in the bottom of the coffee-pot, in which case it will be carried up with the current through the spout into the receiving-chamber, leaving the infused liquid clear. The parts composing the interior attachment all being made separate from each other, they can be readily detached for washing, &c.

The receiving-chamber D is constructed in the following peculiar manner: The bottom $h$ is filled with perforations for holding the grounds and allowing the liquid to pass through. The sides $i\ i$ are made imperforate or closed from bottom to top; but near the top are made a series of openings, $k\ k$, of considerable size, on the inside of which are strainers or screens $l\ l$, of perforated metal, which cover the openings. In the inside of the receiving-chamber is a flange or rim, $m$, which projects some distance toward the center and is made inclined downward, as shown. This flange rests directly under the strainers $l\ l$, and is made to fit closely to the sides of the chamber. The flange is preferably supported by legs $n\ n$, which rest upon the bottom of the receiving-chamber, the whole forming a stand or frame, which can be placed in or removed from the chamber at pleasure.

By the means above described I avoid the difficulty which occurs in coffee-pots of this character by the clogging of the perforations in the bottom and sides of the receiving-chamber. The coffee-grounds frequently become compacted and hardened, obstructing the passages and causing the chamber to overflow even where the perforations extend up in the sides as well as the bottom of the chamber. This is caused by making the holes so small that the grounds fill them without passing through. In this invention the sides are closed or imperforate, and the liquid escapes through the bottom; but should the inflow be greater than the exit, the liquid, when it rises to the top, will escape through the strainers $l\ l$ and openings $k\ k$. The flange $m$ serves the important purpose of preventing the rising of the coffee-grounds to the strainers, said flange holding them down in the inclosed space at the bottom.

Having thus described my invention, I claim—

1. In a coffee-pot, the fountain attachment, consisting of the perforated heating-chamber B, tube C, cap G, and receiving-chamber D, said receiving-chamber being constructed with a perforated bottom, imperforate or closed sides, and with overflow-openings covered by strainers at the top of the chamber, as shown and described, and for the purpose specified.

2. In a coffee-pot provided with the heating-chamber B, tube C, and receiving-chamber D, the combination, with said receiving-chamber, constructed with perforated bottom, closed sides, and overflow-openings at the top, of the flange $m$, below the overflow-openings, for the purpose of preventing the rising of coffee-grounds to the said openings, as herein shown and described.

In witness whereof I have hereunto signed my name in the presence of two subscribing witnesses.

C. FRED. MATTHES.

Witnesses:
R. F. OSGOOD,
R. E. WHITE.